(12) United States Patent
O'Sullivan et al.

(10) Patent No.: US 8,121,880 B2
(45) Date of Patent: Feb. 21, 2012

(54) METHOD FOR CALENDAR DRIVEN DECISIONS IN WEB CONFERENCES

(75) Inventors: Patrick O'Sullivan, Dublin (IE); Carol Zimmet, Boxborough, MA (US)

(73) Assignee: International Business Machines, Armonk, NY (US)

( * ) Notice: Subject to any disclaimer, the term of this patent is extended or adjusted under 35 U.S.C. 154(b) by 1104 days.

(21) Appl. No.: 11/954,989

(22) Filed: Dec. 12, 2007

(65) Prior Publication Data

US 2009/0157414 A1 Jun. 18, 2009

(51) Int. Cl.
*G06Q 10/00* (2006.01)
*G06F 15/16* (2006.01)

(52) U.S. Cl. .............. 705/7.24; 705/7.18; 705/7.19; 709/204

(58) Field of Classification Search .......... 705/7.24, 705/7.18, 7.19; 709/204
See application file for complete search history.

(56) References Cited

U.S. PATENT DOCUMENTS

| | | | |
|---|---|---|---|
| 6,523,012 | B1 | 2/2003 | Glassman et al. |
| 2003/0158900 | A1* | 8/2003 | Santos ................ 709/205 |
| 2004/0019701 | A1* | 1/2004 | McGee et al. ............ 709/250 |
| 2004/0073530 | A1 | 4/2004 | Stringer-Calvert et al. |
| 2004/0073801 | A1 | 4/2004 | Kalogridis et al. |
| 2004/0199580 | A1* | 10/2004 | Zhakov et al. ............ 709/204 |
| 2005/0033813 | A1 | 2/2005 | Bhogal et al. |
| 2005/0074107 | A1* | 4/2005 | Renner et al. .......... 379/202.01 |
| 2005/0246419 | A1 | 11/2005 | Jaatinen |
| 2006/0271419 | A1 | 11/2006 | O'Sullivan |
| 2007/0033251 | A1* | 2/2007 | Mandalia et al. .......... 709/204 |
| 2007/0174104 | A1* | 7/2007 | O'Sullivan et al. ........... 705/9 |
| 2007/0263825 | A1* | 11/2007 | Shah et al. ............. 379/202.01 |
| 2008/0219426 | A1* | 9/2008 | Lai ..................... 379/202.01 |

FOREIGN PATENT DOCUMENTS

| | | |
|---|---|---|
| EP | 1411430 A2 | 4/2004 |
| WO | 0072226 A2 | 4/2003 |

OTHER PUBLICATIONS

Pounds, Marcia Heroux, South Florida Sun-Sentinel Business Strategies Column, Jan. 8, 2004.*

* cited by examiner

*Primary Examiner* — John Hayes
*Assistant Examiner* — Kevin Flynn
(74) *Attorney, Agent, or Firm* — Cantor Colburn LLP; Daniel McLoughlin (57) ABSTRACT

A method for associating a calendar invitation for a calendar event to a web conference for a web conference event is provided. Invitees of a calendar invitation for a calendar event are received and are detected. The invitees of the calendar event are associated to a web conference event. Modifications relating to the invitees of the calendar event are detected. Modifications relating to the invitees of the calendar event are propagated to the web conference event, and the web conference event synchronizes with the calendar event. Modifications relating to the web conference event for the web conference are detected. Modifications relating to the web conference event are propagated to the calendar event, and the calendar event synchronizes with the web conference event. The invitees of the calendar invitation include first, second, and/or third tiers, and the tiers relate to user roles and privileges, such as a hidden or anonymous presence.

1 Claim, 4 Drawing Sheets

METHOD FOR CALENDAR DRIVEN DECISIONS IN WEB CONFERENCES

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

Exemplary embodiments relate to calendar events and web conference events, and particularly to synchronizing calendar events and web conferencing events.

Web conferencing is used to conduct live meetings or presentations over the Internet. In a web conference (e.g., an electronic meeting), each participant sits at his or her own computer, and is connected to other participants via the Internet. This can be either a downloaded application on each of the attendees computers or a web-based application where the attendees will simply enter a "URL" or website meeting address to enter the live meeting or conference. These web-based applications may be used with Flash or Java technology.

A webinar is a type of web conference, that tends to be mostly one-way, from the speaker to the audience with limited audience interaction, such as in a webcast, which is transmission of information in one direction only, like watching a concert on the internet. A webinar, however, can be very collaborative, and include polling and question and answer sessions to allow full participation between the audience and the presenter. A webinar is 'live' in the sense that information is conveyed according to an agenda, with a starting and ending time. In most cases, the presenter may speak over a standard telephone line, pointing out information being presented on screen, and the audience can respond over their own telephones, preferably a speakerphone. There are a few web conferencing technologies on the market that have incorporated the use of Voice over the Internet protocol (VoIP) audio technology, to allow for a truly web-driven presentation, removing the need for any external devices, such as a telephone.

When scheduling participants to attend a web conference, there are only certain options available. It would be desirable to provide mechanisms and techniques for seamlessly scheduling and providing calendar events and web conferences.

SUMMARY

A method for associating a calendar invitation for a calendar event to a web conference for a web conference event is provided in accordance with exemplary embodiments. Invitees of a calendar invitation for a calendar event are received. The invitees of the calendar invitation for the calendar event are detected. The invitees of the calendar event are associated to a web conference event for a web conference. Modifications relating to the invitees of the calendar event are detected. The modifications relating to the invitees of the calendar event are propagated to the web conference event, such that the web conference event synchronizes with the calendar event. Modifications relating to the web conference event for the web conference are detected. The modifications relating to the web conference event are propagated to the calendar event for the invitees, such that the calendar event synchronizes with the web conference event. The invitees, of the calendar invitation for the calendar event, include at least one of a first tier, a second tier, and a third tier.

Additional features and advantages are realized through the techniques of the presented in exemplary embodiments. Other embodiments and aspects of the invention are described in detail herein and are considered a part of the claimed invention. For a better understanding of exemplary embodiments with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features are apparent from the following detailed description taken in conjunction with the accompanying drawings in which:

The detailed description explains exemplary embodiments of the invention, together with advantages and features, by way of example with reference to the drawings.

DETAILED DESCRIPTION OF EXEMPLARY EMBODIMENTS

Figure 1:
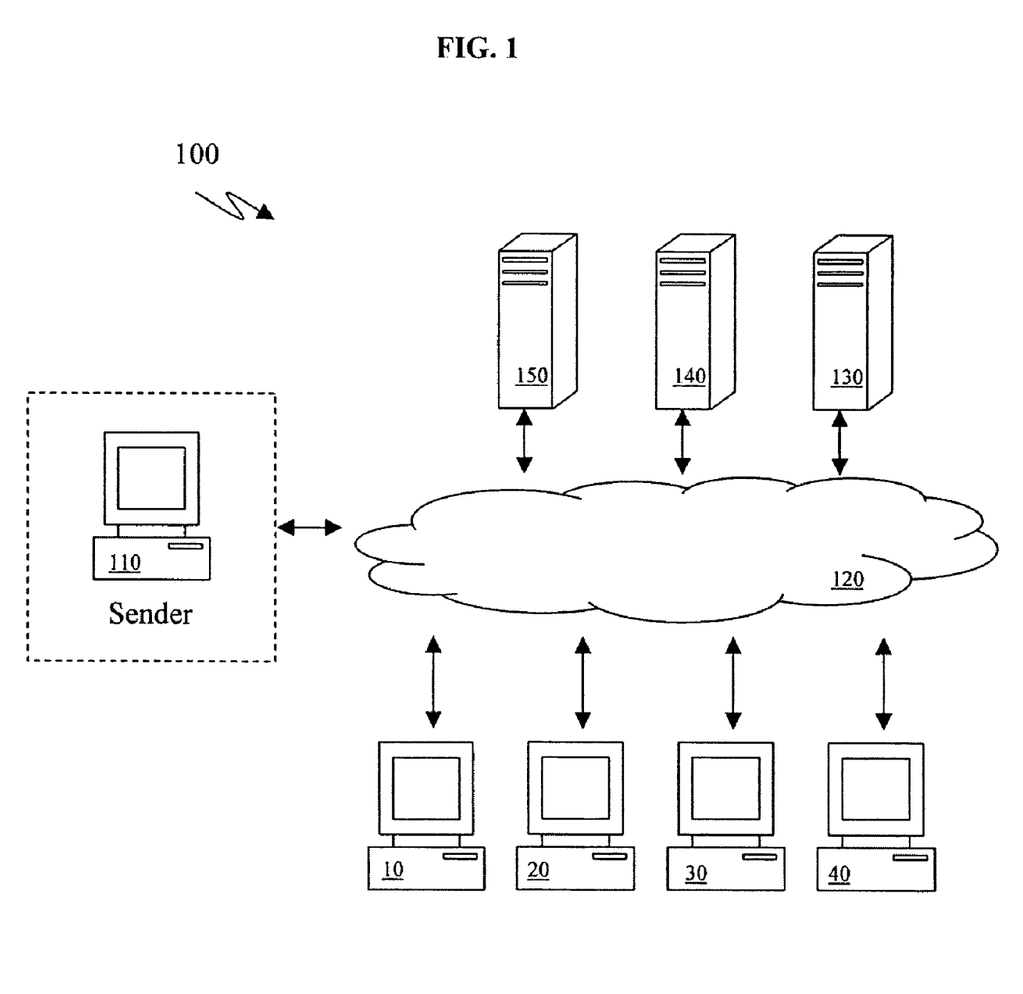
FIG. 1 illustrates a block diagram of a system in accordance with exemplary embodiments.

FIG. 1 illustrates a block diagram of a system 100 in accordance with exemplary embodiments. The system 100 provides an infrastructure through which exemplary embodiments may be implemented. A plurality of communication devices, such as communication devices 110, 10, 20, 30, 40, may be operatively connected to and communicate over a network 120. Also, servers 130, 140, 150 may be operatively connected to and communicate over the network 120.

It is understood that in exemplary embodiments and implementations, communication devices 110, 10, 20, 30, 40 can be a variety of other communication devices such as general purpose or laptop computers, wireless devices such as cellular telephones, portable computing device, digital music players (e.g., MP3 players), mobile devices, etc. In addition, a wireline public switched telephone network (PSTN) telephone, session initiation protocol (SIP) telephone, dual-mode mobile telephone, personal digital assistant (PDA), or other type of communications device may be included in the system 100 of FIG. 1.

The network 120 may include circuit-switched and/or packet-switched technologies and devices, such as routers, switches, hubs, gateways, etc., for facilitating communications among the network entities. The network 120 may include wireline and/or wireless components utilizing, e.g., IEEE 802.11 standards for providing over-the-air transmissions of communications.

In exemplary embodiments, the network 120 can be a managed IP network administered by a service provider (or network administrator), which can control bandwidth and quality of service for the communications discussed herein. The network 120 may be implemented in a wireless fashion, e.g., using wireless protocols and technologies, such as WiFi, WiMax, BLUETOOTH, etc. The network 120 can also be a packet-switched network as a local area network, a wide area network, a metropolitan area network, an Internet network, or other similar types of networks. The network 120 may include a cellular communications network, a fixed wireless network, a wireless local area network (LAN), a wireless wide area network (WAN), a personal area network (PAN), a virtual private network (VPN), an intranet or any other suitable network, and the network 120 may include equipment for receiving and transmitting signals, such as a cell tower, a mobile switching center, a base station, and a wireless access point.

As further shown in FIG. 1, the servers 130, 140, 150 may be implemented using a high-speed processing device (e.g., a computer system) that is capable of handling high volume activities conducted, e.g., by the communication devices 110, 10, 20, 30, 40 and other network entities. According to exemplary embodiments, the servers 130, 140, 150 may receive requests from the communication devices 110, 10, 20, 30, 40 to access services. In exemplary embodiments, one or more of the servers 130, 140, 150 (or another server) may implement authentication software for restricting or controlling access to network services and may be in communication with a customer identity system (CIS) database, which stores user credentials (e.g., user names and passwords).

Furthermore, exemplary embodiments are not limited to but are capable of being implemented in the system 100 illustrated in FIG. 1. Additionally, the servers 130, 140, 150 may be representative of numerous servers. Likewise, the network 120 may be representative of numerous networks. Therefore, the system 100 illustrated in FIG. 1 is neither limited numerically to the elements depicted therein nor limited to the exact configuration and operative connections of elements. Further, it is understood by those skilled in the art that elements may be added to, subtracted from, or substituted for the elements described in the system 100 of FIG. 1.

In accordance with exemplary embodiments, the system 100 provides the ability to associate a calendar invitation for a calendar event (e.g., on the server 140) with a web conference for a web conference event (e.g., on the server 150) such that decisions in the calendar invitation (of the server 140) propagate as behaviors to the web conference (of the server 150).

Figure 2:
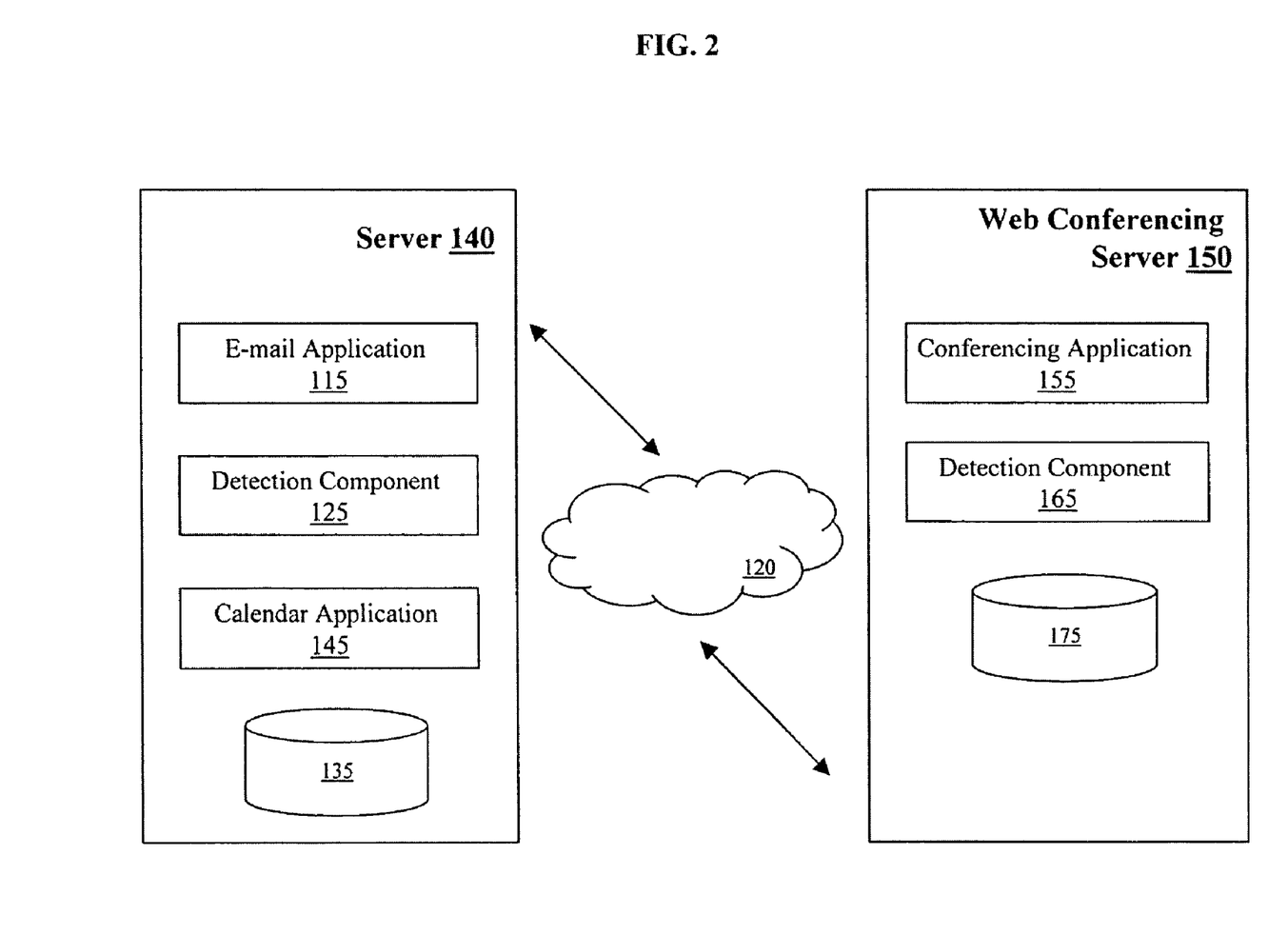
FIG. 2 illustrates further interactions between servers in accordance with exemplary embodiments.

FIG. 2 illustrates further interactions between the server 140 and the server 150 in accordance with exemplary embodiments. The server 140 may comprise an email application 115 for implementing various email functions and a calendar application 145 for implementing various calendar functions. The server 140 may comprise a detection component 125 for detecting web conference event creations/changes on the server 150 and detecting calendar event (and/or calendar invitation) creations/changes on the server 140.

The server 150 (e.g., acting as a web conferencing server) may comprise a conferencing application 155 for implementing web conferencing for web conference events and a detection component 165 for detecting calendar event creations/changes of calendar invitations on the server 140. The detection component 165 may also detect creations/changes of web conference events on the server 150.

The calendar application 145 of the server 140 may receive updates from the detection component 125 (and/or the detection component 165), such that any changes made by the conferencing application 155 for web conference events on the server 150 are reflected in calendar events on the server 140. The conferencing application 155 on the server 150 may receive updates from the detection component 165 (and/or the detection component 125), such that any changes made by the calendar application 145 for calendar events on the server 140 (and/or any changes for calendar invitations) are reflected in web conference events on the server 150.

As a non-limiting example, a sender may transmit a calendar invitation (e.g., via the calendar application 145) from the communication device 110 to the users of the communication devices 10, 20, 30, 40. The calendar invitation from communication device 110 may be transmitted in an email, e.g., using the email application on the server 140. Also, the server 130 may operate as an email server, and the server 130 is in communication with the server 140 so that calendar invitations can be transmitted to the communication devices 10, 20, 30, 40 over the network 120.

The sender using the communication device 110 may input various email addresses in the fields of the calendar invitation. In exemplary embodiments, individuals who are on the "To" and "CC" fields of a calendar invitation of the server 140 may propagate to the web conference hosted on the server 150 with conventional attendee privileges, and individuals who are on the "BCC" field may propagate as hidden (or anonymous) participants to the web conference for the web conference event on the server 150. Moreover, when a web conference occurs for a web conference event on the server 150, the individuals listed in the TO, CC, and BCC fields are able to attend the web conference event in accordance with privileges associated with each respective field (i.e., the TO, CC, and BCC fields) of the calendar invitation. The status of each individual attending the web conference event may correspond to the TO, CC, and BCC fields (or any other fields) of the calendar invitation. The behavior described above can be consistent for repeat meetings using web conferencing on the server 150.

If the calendar event changes (e.g., people added, people deleted, people promoted from BCC to TO or CC) on the server 140, then an associated workflow between the scheduled web conference event on the server 150 and calendar invitation on the server 140 works on behalf of the moderator (e.g., the sender) to automate the change in decisions. As non-limiting examples, the detection component 165 of the server 150 detects changes to the calendar event (and/or calendar invitation), and the conferencing application 155 applies the corresponding changes to the scheduled web conference event. The detection component 165 is in communication with the calendar application 145 and/or the email application 115, and if a change is made to the calendar invitation and/or calendar event, the detection component 165 recognizes the change.

Likewise, post calendar-invitation creation decisions made in the web conference event of the server 150 propagate to the calendar invitation for the calendar event on the server 140. As non-limiting examples, the moderator (which may be the sender) of the web conference event may make a change (e.g., change the time, location, date, usernames/passwords, documents, etc.) to the web conference event of the server 150. The detection component 125 of the server 140 detects the changes in the web conference event of the server 150 (e.g., by communicating with the conferencing application 155), and the calendar application 145 applies the corresponding changes of the web conference event to the calendar event on the server 140. The calendar event remains synchronized with the web conference event even after the initial calendar invitation was transmitted from the sender on the communication device 110 to the communication devices 10, 20, 30, 40. Even if a modification is made to the web conference event after the calendar invitation has been transmitted, the calendar application 145 can transmit any updates made by the moderator (sender) to the communication devices 10, 20, 30, 40.

Furthermore, updates to calendar events on the server 140 by the moderator (e.g., adding an attachment, updating the event, updating the attendees/invitees, removing attendees/invitees, changing the time, etc.) are handled by this workflow and propagated back to the web conference event on the server 150. Similarly, updates to the web conference event on the server 150 by the moderator (e.g., adding an attachment, updating the event, updating the attendees/invitees, removing attendees/invitees, changing the time, etc.) are handled by this workflow and propagated back to the calendar event on the server 140. Exemplary embodiments support a calendaring-web conferencing interface and provide a workflow that allows changes and decisions on either side (e.g., servers 140, 150) to propagate to the other system seamlessly (which may be in asynchronous way).

Exemplary embodiments support user attendance profiles of web conferencing events on the server 150, including the recognition of BCC type users in a web conference on the server 150. Exemplary embodiments allow additional web conference attendance profiles. Typically, for users who are attending an electronic web conference meeting, their attendance is made known and visible to all participants through a user interface display. Additionally, there is typically an accompanying voice channel for communications that attendees can make their presence known. Also, additional application options are enabled when the attending users are known in a web conference, e.g., meeting voting, cross meeting chat, and questions posed to the web conference are all identified by username.

In accordance with exemplary embodiments, there are a variety of reasons why users may want to attend a meeting and/or web conference and not have their presence known. They would accept not being able to exercise their online web conference meeting options (e.g., meeting chat or meeting voting), for just listening into the meeting exchange of the web conference event. Exemplary embodiments support the concept of "anonymous" and "hidden" user attendance to an electronic meeting for the associated web conference. As a non-limiting example, the sender on the communication device 110 may transmit a calendar invitation (e.g., as BCC) to the user of the communication device 10. The detection device 165 may detect the calendar invitation and transmit this information to the conferencing application 155, so that the conferencing application 155 can create a web conference event on the server 150 with privileges (or a status) according to the BCC designation. The BCC designation for the user of the communication device 110 may translate as anonymous or hidden for the corresponding web conference event. As a non-limiting example, the users of the communication devices 20, 30 may be designated in the TO field of the calendar invitation. The detection component 165 detects the TO designations and translates the TO designations for the users of the communication devices 20, 30 to the web conference event on the server 150 with normal privileges.

The conferencing application 155 receives the various designations (e.g., TO, CC, and BCC). The conferencing application 155 applies the privileges to the web conference event on the server 150 in accordance with the designations in the calendar invitation for the calendar event of the server 140. When the web conference event is in session, the web conference event may display the user with the BCC designation as anonymous, or the user may be hidden (so no one can see that the user is participating in the web conference event). As an anonymous participant of the web conference event, only the word "anonymous" may be seen by others who are attending the web conference event. As a hidden participant of the web conference event, nothing is seen by others which would acknowledge the hidden participants.

As a non-limiting scenario, a meeting (a web conference) may be called by a moderator on a topic that holds interest to a large number of people, but only a core number of people attending need to be discussing the topic, while the others attending the meeting are sufficiently enabled to just listen in. This meeting has an associated web conference setup (e.g., on the server 150), where visuals are posted and discussed. Exemplary embodiments provide an option for the meeting invitation (i.e., the calendar invitation) to support anonymous invitations and attendees, where a user (e.g., on the communication device 10) accepting as anonymous will have his or her name appear as anonymous through the associated web conferencing visual (on the server 150). The conferencing application 155 allows each succeeding user attending as anonymous to appear as an additional anonymous user (which may signal that other users are attending the web conference).

As a non-limiting scenario, a meeting (a web conference) may be called by a moderator on a topic and the meeting invitees have been identified. One (or more) person is part of the project team and will not be part of the invitee list. The moderator made a decision or received a recommendation to include this individual in a non-intrusive way (e.g., by designating the person as BCC in the calendar invitation). This individual should be invited to the meeting in a hidden capacity (e.g., BCC). The individual can attend and be alerted of the meeting invite (e.g., calendar invitation for the calendar event that is translated into the web conference event), but will not be visually attending and known to be present by the other attendees.

Exemplary embodiments correlate the relationships between calendar invitations on the server 140 and associated web conferences on the server 150. Exemplary embodiments support detection and update of associated scheduled entries (in the calendar events and web conference events) to remain in step and appear as one integrated unit.

In accordance with exemplary embodiments, there are users who would benefit from attending web conference events of the server 150 by just listening in, where their presence is understood, implied, or not acknowledged at all. The conferencing application 155 allows these uniquely invited users' attendance to appear as anonymous to alert attendees that others are attending without giving their names. Also, the conferencing application 155 allows these users to be hidden, where their names will not appear in the attendee list at all, thus giving no indication that there are additional attendees. The conferencing application 155 may allow the privileges of those designated as BCC to change. For example, there can be additional access granted (such as ok, no, or granted access at selective times) for the web conference event so that anonymous or hidden users are able to talk during the web conference event.

In accordance with exemplary embodiments, meeting logic (of the conferencing application 145) detects that hidden and/or anonymous user(s) are specified (in the calendar invitation for the calendar event). A list of these users (e.g., users of the communication devices 10, 20, 30, 40) may be formed and the web conferencing server (server 150) is contacted. The list of users, the user status type (hidden or anonymous) is passed over to or retrieved by the web conferencing server (the server 150), e.g., by the detection component 165.

The scheduled meeting becomes active at the scheduled time, such that the web conference event becomes active at the scheduled time on the server 150. As new users join the web conference event, their names are checked next to this list. If a match is found (by the conferencing application 155), a decision is made. If the user is listed as an anonymous user, then a web conference meeting attendees list is updated with an entry for anonymous (if not already present). If the user is listed as hidden, no special user information updates are made. In both cases, users are granted access to attend the web conference event hosted by the web conference server (the server 150). The web conferencing server (the server 150) can handle additional name updates.

As additional anonymous attendees join, a count may appear next to the anonymous entry to reflect how many anonymous users are attending. As each hidden and/or anonymous user joins, their presence is reported to the meeting invitee (e.g., the sender or moderator) although others may not be aware.

There can be a variety of access grants established, as to who can invite anonymous or hidden users (e.g., the meeting caller only, the meeting moderator if different, or all users).

Referring to FIG. 2, in accordance with exemplary embodiments, coordination components (e.g., detection components 125 and 165) between calendar invite processing and the web conference scheduling are used to synchronize operations in the server 140 (and/or the server 130) and the server 150. The detection component 165 on the server 150 detects when a calendar entry for a calendar event is created or modified on the server 140. The detection component 125 on the server 140 detects when a web conference entry for a web conference event is created or modified on the server 150.

In exemplary embodiments, the server 140 may include or be operatively connected to a storage 135. The storage 135 may include calendar invitations and calendar events. The server 150 may include or be operatively connected to a storage 175. The storage 175 may include scheduled web conference events for web conferences. As a non-limiting example, when relevant field changes are detected in the storage 135 of the server 140 by the detection component 165 of the server 150, the detection component 165 relays the information to the conferencing application 155 for update to the corresponding web conferencing event of the server 150. As a non-limiting example, when relevant field changes are detected in the storage 175 of the server 150 by the detection component 125 of the server 140, the detection component 125 relays the information to the calendar application 145 (and/or email application 115) for update to the corresponding calendar event (and/or resending of the calendar invitation) of the server 140.

Further, an acknowledgement may be sent back to the originator (e.g., the sender and/or the moderator) when updates are complete for the calendar events and web conference events in the servers 140, 150, respectively.

Even though the meeting inviter (sender) is the same as the meeting moderator examples, it is understood that the meeting inviter could be different than the meeting moderator.

Although the detection components 125, 165 are provided for explanatory purposes, the detection components 125, 165 are not meant to be limiting. In accordance with exemplary embodiments, different applications, components, and/or mechanisms may be used for associating these two scheduled events. As a non-limiting example, there may be a single component or application that is responsible for associating calendar invitations and calendar events of the server 140 with web conference events for web conferences on the server 150. In other words, there may be only one detection component that is capable of detecting creation and modification of both calendar events and web conference events on the servers 140 and 150, respectively. The one detection component (and/or the calendar application 145, the conferencing application 155, or the detection components 125, 165) can transmit the necessary information between the two servers 140, 150 in accordance with exemplary embodiments.

Also, in exemplary embodiments, the detection component 125 itself may detect the creation or modification of calendar events on the server 140, and the detection component 125 may forward this information to the detection component 165 (or conferencing application 155) of the server 150. Similarly, the detection component 165 itself may detect the creation or modification of web conference events, and the detection component 165 may forward this information to the detection component 125 (or calendar application 145) of the server 140.

Figure 3:
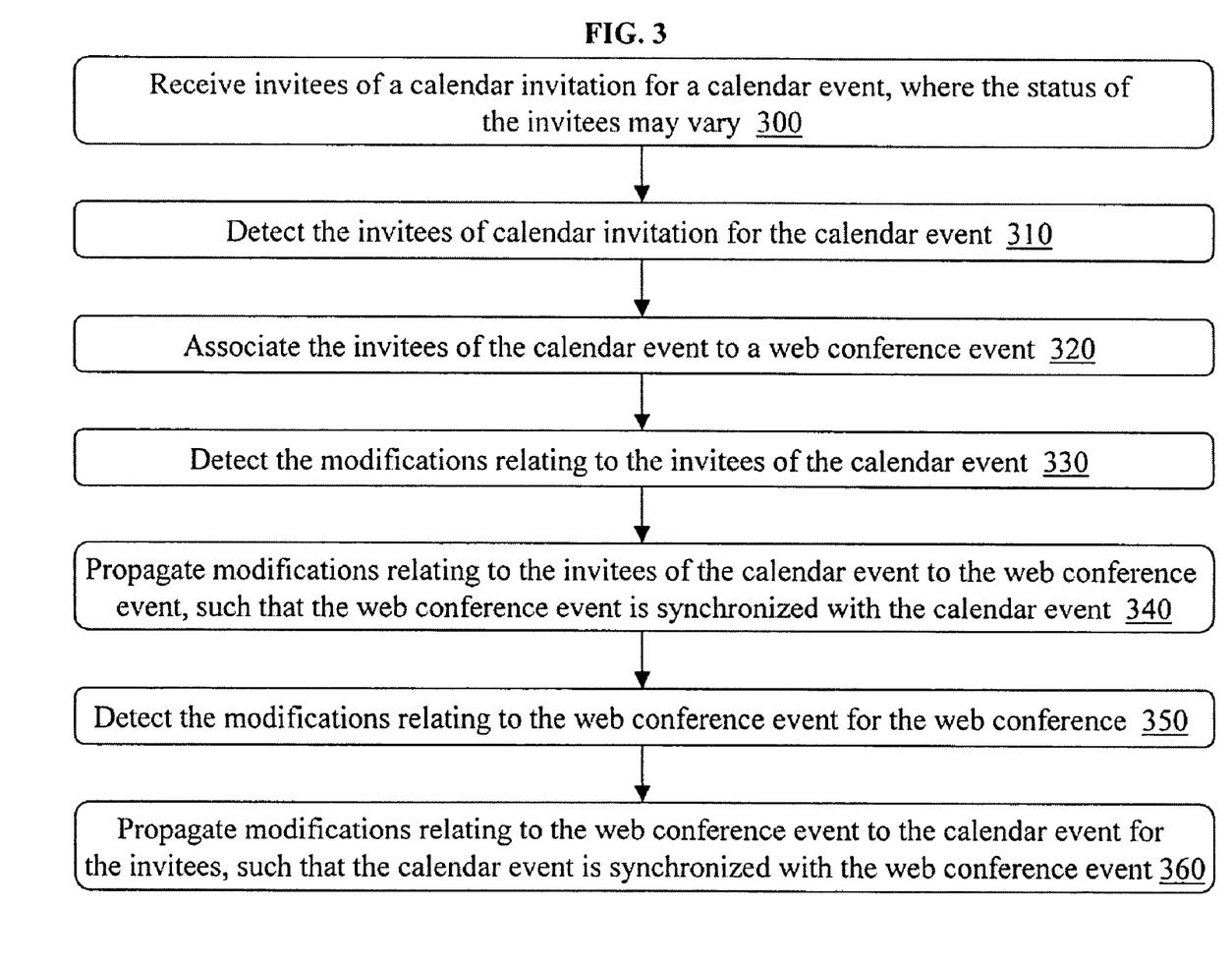
FIG. 3 illustrates a method for associating a calendar invitation for a calendar event to a web conference for a web event in accordance with exemplary embodiments.

FIG. 3 illustrates a method for associating a calendar invitation for a calendar event to a web conference for a web event in accordance with exemplary embodiments.

Invitees of a calendar invitation for a calendar event are received by the calendar application 145 of the server 140 at 300. The status of the invitees may vary from each other. For example, the invitees may be designated in accordance with the TO field, the CC field, the BCC field, or any other available field.

The invitees of the calendar invitation for the calendar event are detected by the detection component 165 of the server 150 (and/or the detection component 125) at 310. The invitees of the calendar event on the server 140 are associated to a web conference event for a web conference on the server 150 by the conferencing application 155 at 320. As a non-limiting example, the calendar application 145 may transmit the calendar event information for the invitees to the conferencing application 155 via the network 120, such that the conferencing application 155 can create a corresponding web conference event. As a non-limiting example, the conferencing application 150 may retrieve the calendar event information for the invitees from the storage 135.

Any modifications relating to the invitees of the calendar event can be detected by the detection component 165 at 330. The modifications relating to the invitees of the calendar event are propagated to the web conference event by the calendar application 145 via the network 120, such that the web conference event synchronizes with the calendar event at 340. Also, the conferencing application 155 may retrieve modifications to the calendar event. Further, the detection components 165, 125 may transmit the modifications to the conferencing application 155.

Any modifications relating to the web conference event for the web conference are detected by the detection component 125 at 350. The modifications relating to the web conference event are propagated to the calendar event for the invitees by the conferencing application 155 via the network 120, such that the calendar event synchronizes with the web conference event at 360. Also, the calendar application 145 may retrieve modifications to the calendar event. Further, the detection components 125, 165 may transmit the modifications to the calendar application 145.

In accordance with exemplary embodiments, the invitees, of the calendar invitation for the calendar event, may include a first tier, a second tier, and/or a third tier. The invitees of the first tier may be known to others in the web conference event hosted on the server 150. The invitees of the second tier may be known as anonymous to others in the web conference event hosted on the server 150. The invitees of the third tier are hidden from the others in the web conference event hosted on the server 150. If additional invitees of the second tier join the web conference event, the conferencing application 155 may have a count to reflect the number of anonymous invitees attending the web conference event hosted on the server 150.

If the invitees of the second tier and the third tier join the web conference event, the presence of the invitees of the second tier and the third tier is reported to the meeting invitee. The meeting invitee (e.g., the moderator or the sender) is informed of the actual names (e.g., usernames) of all attending, including the hidden and anonymous participants.

Figure 4:
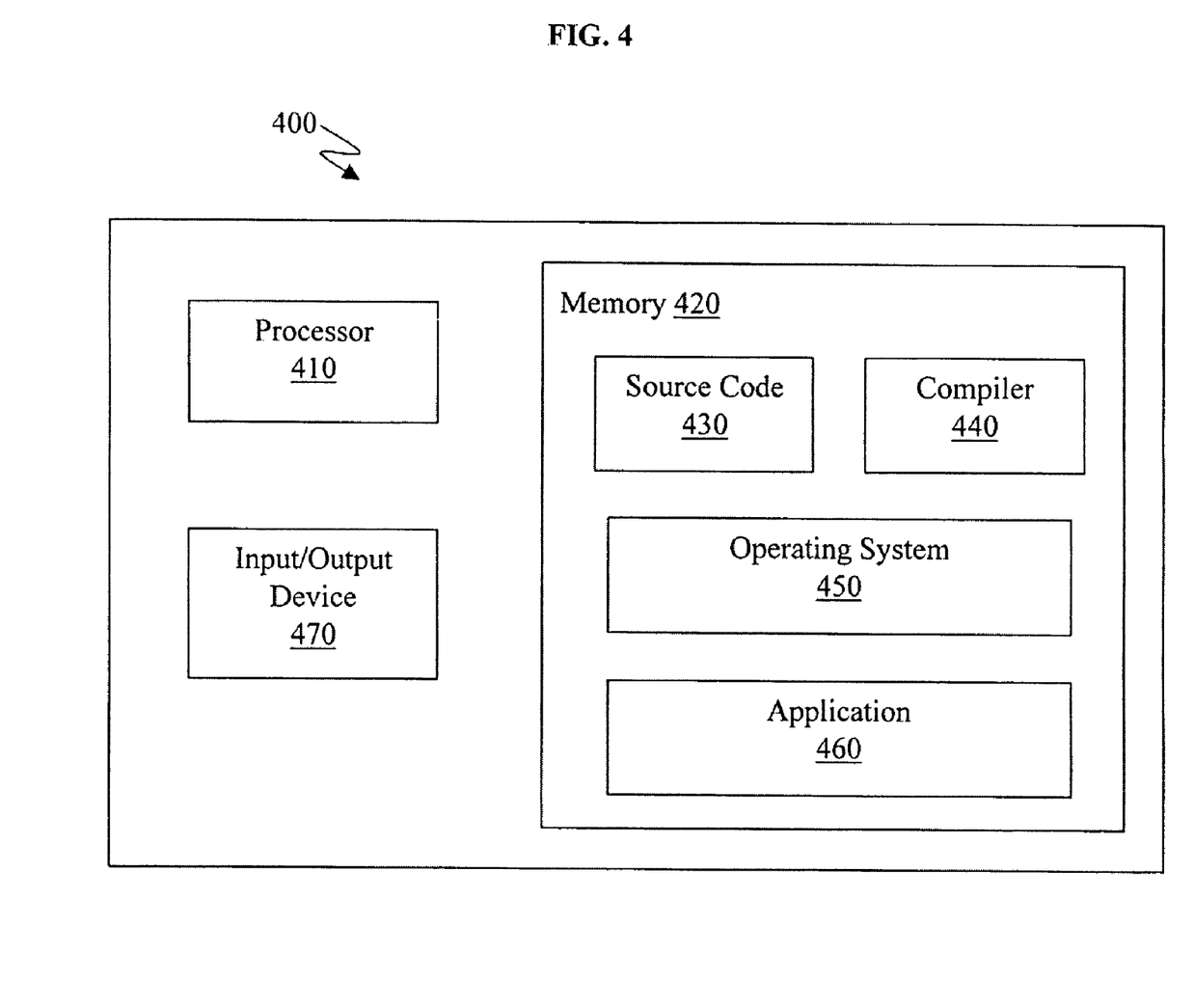
FIG. 4 illustrates an example of a computer having capabilities that may be utilized in implementations of exemplary embodiments.

FIG. 4 illustrates an example of a computer having capabilities, which may be included in exemplary embodiments. Various methods discussed above may also utilize the capabilities of the computer 400. One or more of the capabilities of the computer 400 may be incorporated in the servers 130, 140, 150, in the communication devices 10, 20, 30, 40, 110, and/or any element discussed herein.

The computer 400 includes, but is not limited to, PCs, workstations, positional and/or guidance devices, laptops, PDAs, palm devices, Internet protocol enabled televisions, set top boxes, servers, and the like. Generally, in terms of hardware architecture, the computer 400 may include one or more processors 410, memory 420, and one or more input and/or output (I/O) devices 470 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 410 is a hardware device for executing software that can be stored in the memory 420. The processor 410 can be virtually any custom made or commercially available processor, a central processing unit (CPU), a data signal processor (DSP), or an auxiliary processor among several processors associated with the computer 400, and the processor 410 may be a semiconductor based microprocessor (in the form of a microchip) or a macroprocessor.

The memory 420 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 420 may incorporate electronic, magnetic, optical, and/or other types of storage media. Note that the memory 420 can have a distributed architecture, where various components are situated remote from one another, but can be accessed by the processor 410.

The software in the memory 420 may include one or more separate programs, each of which comprises an ordered listing of executable instructions for implementing logical functions. The software in the memory 420 includes a suitable operating system (O/S) 450, compiler 440, source code 430, and an application 460 (which may be one or more applications) of the exemplary embodiments. As illustrated, the application 460 comprises numerous functional components for implementing the features and operations of the exemplary embodiments. The application 460 of the computer 400 may represent the various applications referred to herein, but the application 460 is not meant to be a limitation.

The operating system 450 may control the execution of other computer programs, and provides scheduling, input-output control, file and data management, memory management, and communication control and related services. It is contemplated by the inventors that the application 460 for implementing exemplary embodiments is applicable on all other commercially available operating systems.

The application 460 may be a source program, executable program (object code), script, or any other entity comprising a set of instructions to be performed. When a source program, then the program is usually translated via a compiler (such as the compiler 440), assembler, interpreter, or the like, which may or may not be included within the memory 420, so as to operate properly in connection with the O/S 450. Furthermore, the application 460 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN. COBOL, Perl, Java, ADA, .NET, and the like.

The I/O devices 470 may include input devices such as, for example but not limited to, a mouse, keyboard, scanner, microphone, camera, etc. Furthermore, the I/O devices 470 may also include output devices, for example but not limited to, a printer, display, etc. Further, the I/O devices 470 may further include devices that communicate both inputs and outputs, for instance but not limited to a NIC or modulator/demodulator (for accessing remote devices, other files, devices, systems, or a network), a radio frequency (RF) or other transceiver, a telephonic interface, a bridge, a router, etc. The I/O devices 470 also include components for communicating over various networks, such as the networks 120.

If the computer 400 is a PC, workstation, intelligent device or the like, the software in the memory 420 may further include a basic input output system (BIOS) (omitted for simplicity). The BIOS is a set of essential software routines that initialize and test hardware at startup, start the O/S 450, and support the transfer of data among the hardware devices. The BIOS is stored in some type of read-only-memory, such as ROM, PROM, EPROM, EEPROM or the like, so that the BIOS can be executed when the computer 400 is activated.

When the computer 400 is in operation, the processor 410 is configured to execute software stored within the memory 420, to communicate data to and from the memory 420, and to generally control operations of the computer 400 pursuant to the software. The application 460 and the O/S 450 are read, in whole or in part, by the processor 410, perhaps buffered within the processor 410, and then executed.

When the application 460 is implemented in software it should be noted that the application 460 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 460 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 460 is implemented in hardware, the application 460 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 400 includes non-limiting examples of software and hardware components that may be included in various devices and systems discussed herein, and it is understood that additional software and hardware components may be included in the various devices and systems discussed in exemplary embodiments.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments described, it will be understood that those skilled in the art, both now and in the future, may make various improvements and enhancements which fall within the scope of the claims which follow. These claims should be construed to maintain the proper protection for the invention first described.

What is claimed is:

1. A method for associating a calendar invitation for a calendar event to a web conference for a web conference event, comprising:

receiving invitees of a calendar invitation for a calendar event;

detecting the invitees of the calendar invitation for the calendar event, wherein the invitees correspond to a To field of an email, a carbon copy field of the email, and a blind carbon copy field of the email;

associating the invitees of the calendar event to a web conference event for a web conference such that the invitees in the blind carbon copy field of the email are translated to be displayed as anonymous during the web conference;

wherein the invitees in the To field and the carbon copy field of the email have normal attendee privileges in the web conference;

detecting by a server modifications relating to the invitees of the calendar event, such that in response to the modifications relating to the invitees being to promote the invitees in the blind carbon copy field to the To field, the invitees in the blind carbon copy field are promoted to the To field for the web conference to have normal attendee privileges;

propagating by the server the modifications relating to the invitees of the calendar event to the web conference event, such that the web conference event synchronizes with the calendar event;

detecting modifications relating to the web conference event for the web conference; and wherein the modifications relating to the web conference event include changes to a time for the web conference, changes to a location for the web conference, changes to a date for the web conference, and changes to a password for the web conference;

propagating the modifications relating to the web conference event to the calendar event for the invitees, such that the calendar event synchronizes with the web conference event for changes to the time for the web conference, changes to the location for the web conference, changes to the date for the web conference, and changes to the password for the web conference;

wherein the invitees, of the calendar invitation for the calendar event, comprise the To field, the carbon copy field, and the blind carbon copy field of the email; and wherein a count appears next to an anonymous entry on the computer, in which the count appearing next to the anonymous entry is a number of the invitees in the blind carbon copy field that join the web conference as anonymous attendees, such that each succeeding one of the anonymous attendees joins the web conference with an appearance as an additional anonymous attendee.

* * * * *